(12) United States Patent
Miyasaka et al.

(10) Patent No.: US 6,817,021 B1
(45) Date of Patent: Nov. 9, 2004

(54) DISK DEVICE AND GUIDE MEMBER

(75) Inventors: Shigehisa Miyasaka, Tokyo (JP);
Kazusato Tagawa, Tokyo (JP); Sachiko Inoue, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/691,403

(22) Filed: Oct. 18, 2000

(30) Foreign Application Priority Data

Oct. 22, 1999 (JP) .......................................... P11-300985

(51) Int. Cl.[7] .......................... G11B 33/02; G11B 17/04
(52) U.S. Cl. ...................................................... 720/603
(58) Field of Search .............................. 369/75.1–77.2; 720/601, 603, 613

(56) References Cited

U.S. PATENT DOCUMENTS

| | | | | |
|---|---|---|---|---|
| 5,844,874 A | * | 12/1998 | Saito et al. ................. | 369/75.1 |
| 5,878,013 A | * | 3/1999 | Maeda et al. ............... | 369/75.1 |
| 6,052,352 A | * | 4/2000 | Liou .......................... | 369/77.1 |
| 6,301,213 B1 | * | 10/2001 | Cundiff, Sr. ................ | 369/75.2 |

FOREIGN PATENT DOCUMENTS

| | | | |
|---|---|---|---|
| DE | 2210818 | | 9/1973 |
| JP | 6-251479 | | 9/1994 |
| JP | 6-325455 | | 11/1994 |
| JP | 6-333311 | | 12/1994 |
| JP | 7-326177 A | * | 12/1995 |
| JP | 8-17118 | | 1/1996 |
| JP | 8-045154 A | * | 2/1996 |
| JP | 8-235715 A | * | 9/1996 |
| JP | 8-273265 A | * | 10/1996 |
| JP | 8-321111 A | * | 12/1996 |
| JP | 9-055007 A | * | 2/1997 |
| JP | 11-167760 | | 6/1999 |

* cited by examiner

*Primary Examiner*—William Klimowicz
(74) *Attorney, Agent, or Firm*—Katten Muchin Zavis Rosenman

(57) ABSTRACT

A disk device is provided with a disk tray having a detachable guide member, which guides an optical disk between a depression and claws provided thereon. When an optical disk is to be mounted within a disk device in the vertical orientation, the optical disk can automatically be guided between depression and claws by moving the disk along the guide member. In addition, because the guide member is detachable, it can be attached if the disk device is to be used in vertical orientation and removed if it is to be used in horizontal orientation.

14 Claims, 5 Drawing Sheets

DISK DEVICE AND GUIDE MEMBER

FIELD OF THE INVENTION

This invention concerns a disk device having a disk tray with a depression into which a disk for recording and/or playback is inserted and by which said disk is loaded into the device main body, and a guide member provided on said disk device for holding said disk in position on said disk tray.

BACKGROUND OF THE INVENTION

Long known as disk devices for CD, DVD, and other optical disk drives, etc. are disk devices in which an optical disk, which is an information recording medium, is inserted into a depression in a disk tray placed approximately horizontally, and said optical disk is loaded by accommodating the disk tray inside the device main body. With such a disk device, it suffices merely to place the optical disk in the disk tray and load such disk inside the device main body, and to place in the disk tray optical disks of different diameters, such as 8 cm and 12 cm, thereby making it possible to handle with a single disk device various optical disks of different diameters.

The aforesaid disk device, besides being used in the horizontal orientation, in which the disk tray is horizontal, is also sometimes used in the vertical orientation, in which the disk tray is vertical. If the disk device is oriented vertically, it is not possible, just by inserting an optical disk into the depression, to hold the optical disk in the disk tray. Therefore, as disclosed in Japanese unexamined patent H6-251479 [1994], a disk device has been proposed that has a disk tray equipped with claws for holding the optical disk loosely clamped against the external circumference of the depression from outside its surface.

In such a prior art disk device, if used in the vertical orientation, there is the problem that the vertical orientation sometimes causes the disk mounting surface of the disk tray to be on the opposite side from the user's favored hand, complicating the mounting of said disk. Specifically, when a right-handed user tries to remove the disk from the disk accommodation case with his right hand and mount said disk from the right side of the disk tray, he must twist his wrist, and mounting the disk becomes difficult, which invites mounting failure. On the other hand, when a right-handed user tries to remove the disk from the disk accommodation case with his right hand, transfer said disk to his left hand, then mount it, the possibility of a mounting failure is reduced, but mounting with one's unaccustomed hand takes more time and makes the mounting operation more troublesome.

Moreover, particularly when used in the vertical orientation, there is the problem that the disk must be accurately inserted in the narrow space between the claws and the disk tray, which makes mounting failure even more likely.

SUMMARY OF THE INVENTION

It is an object of the present invention to provide a disk device and guide member that make the disk mounting operation easy.

In one embodiment, there is provided a disk device that has a disk tray having a circular depression into which a disk is inserted and by which said disk is loaded into a device main body, and is characterized in that claws that can support part of the external circumference of the disk are provided on the external circumference of the depression, and a guide member that guides the disk between the depression and the claws is removably attached to the disk tray. In accordance therewith, when a disk is to be mounted into the disk device in the vertical orientation, said disk can be automatically guided between the depression and the claws by moving the disk along the guide member. This eliminates the inconvenience of disk mounting caused by the vertical orientation of the disk device and facilitates the operation of mounting the disk into the disk tray. In addition, because the guide member is detachable, it can be removed if it is to be used in horizontal orientation, in which case the operation of mounting a disk is made easy regardless of the orientation of the disk device.

In a second embodiment, there is provided a disk tray having a depression into which a disk is inserted and, on the external circumference of the depression, claws that can support part of the external circumference of the disk, and a guide member having a guide surface that is continuous with the disk-facing disk support surface of said claws for guiding the disk between the depression and the claws, said guide member being formed detachably with respect to said disk tray. It is preferable that the guide member be constructed so as to grasp the claws of the disk tray from both sides. It is also preferable if the guide member is constructed so as to be detachable on the claws of the disk tray, so there will be no need for any special manufacturing or processing to attach and detach the guide member to and from the disk device. Thus it becomes possible to easily apply the guide member to any general-purpose disk device for guiding and holding a disk used therewith.

DETAILED DESCRIPTION OF THE PREFERRED EMBODIMENTS

Figure 1:
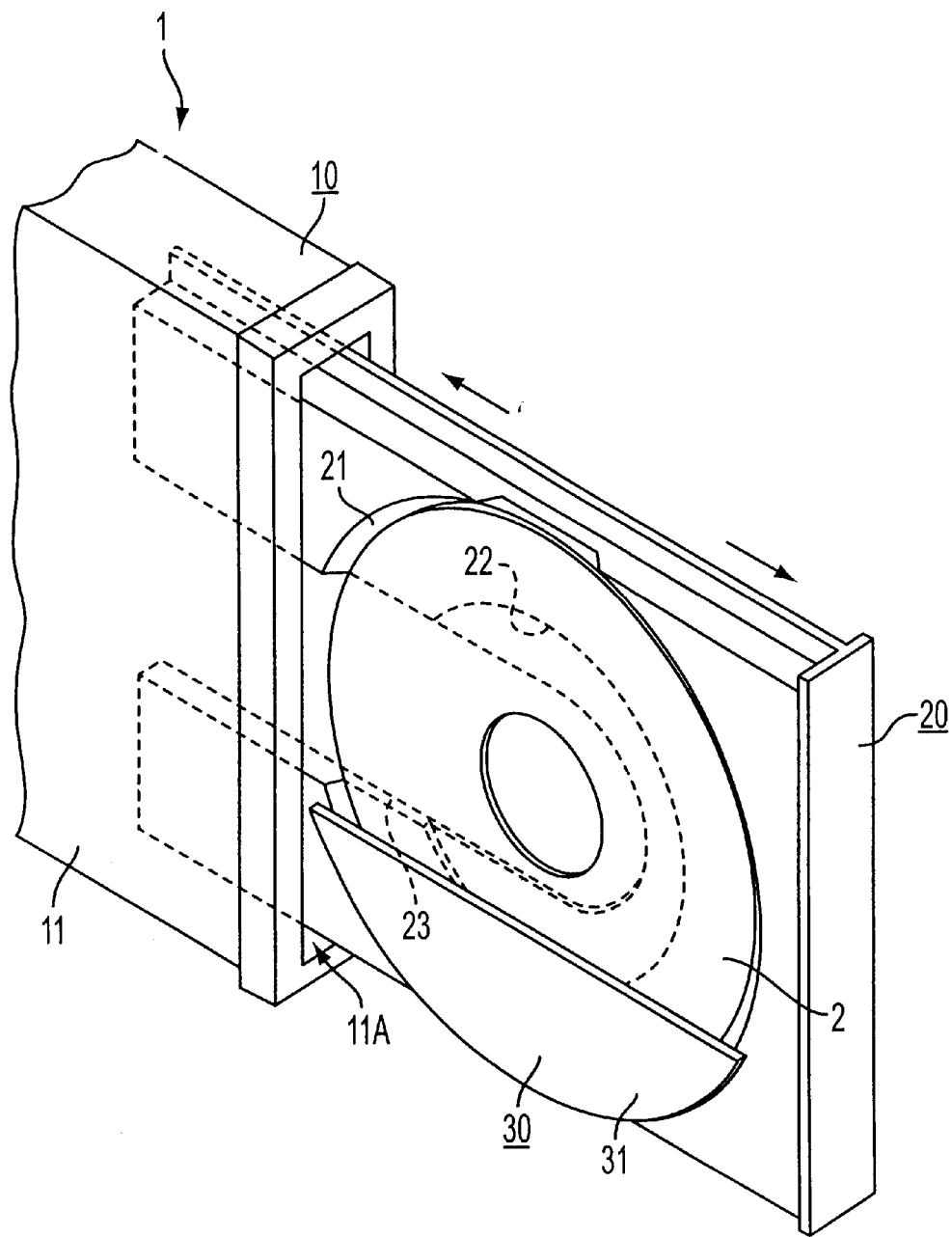
FIG. 1 is a perspective view showing the disk device of an embodiment of this invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
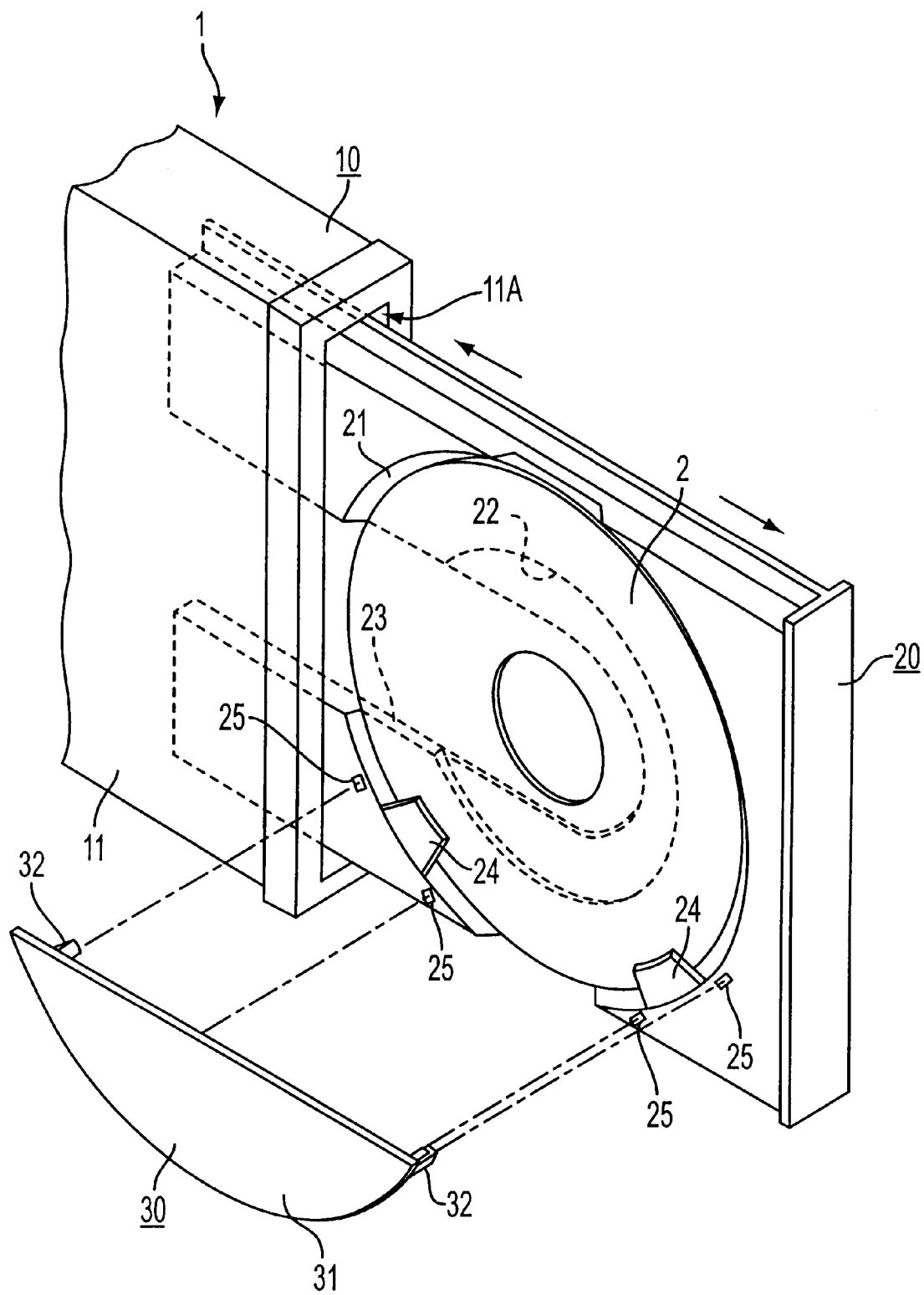
FIG. 2 is an exploded perspective view showing the disk device in the aforesaid embodiment.

FIGS. 1 and 2 show a disk device 1 of the first embodiment of the present invention. Disk device 1, which plays back a CD-ROM, DVD-ROM, or other type of disk 2, comprises a device main body 10, inside which an optical pickup unit (not shown) is accommodated, and a disk tray 20, by which optical disk 2 is loaded into the device main body 10. Device main body 10 has outer case 11, in which is formed opening 11A for putting in and taking out disk tray 20, a spindle motor (not shown) and chucking pulley (not shown) that cause optical disk 2 placed in disk tray 20 to rotate, and an optical pickup unit that reads the information recorded on optical disk 2. Formed on the surface of disk tray 20 are circular depressions 21, 22 into which optical disk 2 is inserted; of these, depression 21 corresponds to a 12 cm diameter disk, and depression 22 corresponds to an 8 cm diameter disk. Formed approximately in the center part of disk tray 20 is opening 23 into which the optical pickup unit is inserted when said disk tray 20 is inserted into device main body 10. Such a disk tray 20 is preferably a plastic molded product, for which a high-wear material such as POM (polyoxymethylene, polyacetal) is adopted.

As shown in FIG. 2, formed in the low side of the external circumference of depression 21 are two roughly square-plate-shaped claws 24 that support part of the external circumference of optical disk 2. By inserting optical disk 2 between these claws 24 and depression 21, said optical disk 2 is mounted in disk tray 20. While the claws 24 in FIG. 2 are shown as square-shaped, it will be understood that the claws 24 may be constructed as other shapes as long as they retain a disk mounted in the tray. In addition, square-shaped holes 25 are formed on both sides of each claw 24 along the external circumference of depression 21. Such holes are adapted to receive engagement parts 32 of a guide member 30 provided on the lower side of such a disk tray 20 as seen in FIGS. 1 and 2, which guides optical disk 2 between depression 21 and claws 24.

Figure 3:
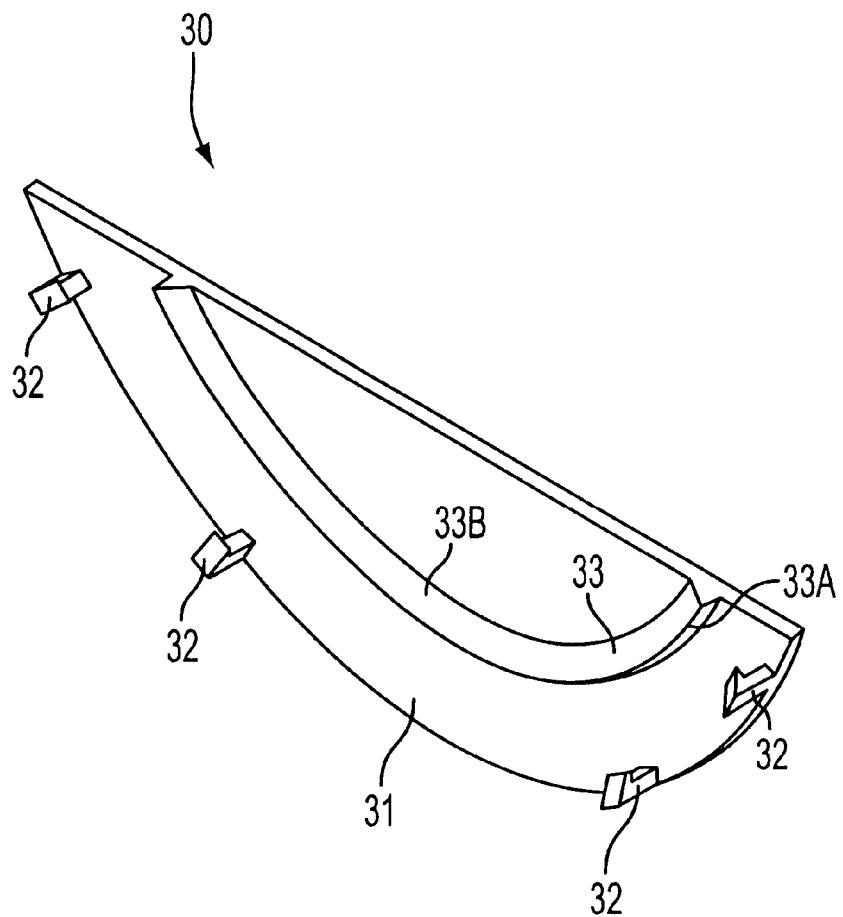
FIG. 3 is a perspective view showing the guide member in the aforesaid embodiment of this invention.

More specifically, as shown in FIG. 3, guide member 30 has a cover 31, four engagement parts 32 provided on said cover 31, and a guide part 33, all preferably formed as an integral mold. Cover part 31, which is approximately large enough to cover part of optical disk 2 when attached to disk tray 20, traces a circular arc along the external circumference of depression 21 and is formed in a roughly semicircular shape.

Figure 4:
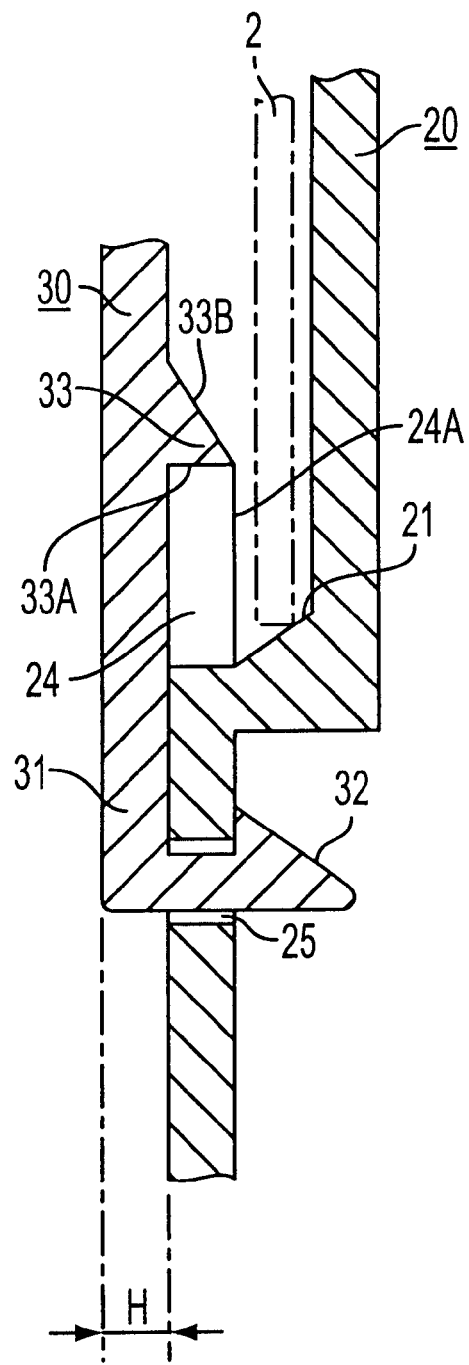
FIG. 4 is a cross-sectional view showing the engagement part between the guide member and the disk tray in the aforesaid embodiment.

As shown in FIG. 4, engagement parts 32 are preferably formed with a J-shaped cross-section and are provided in positions corresponding to holes 25 (see FIG. 2). When guide member 30 is attached to disk tray 20, the tips of the engagement parts 32 engage with holes 25. That is, holes 25 are engagement stop holes into which engagement parts 32 engage. Guide member 33 has contact surface 33A, which comes into contact with the end faces of claws 24, and guide surface 33B, which is continuous with the disk support surfaces 24A of claws 24 that face optical disk 2 and slopes toward said disk support surface 24A, is formed with a triangular cross-sectional shape and is provided continuously along the circular arc of cover part 31. Engagement part 32 and guide part 33 are provided on the surface of cover part 31 that is opposite disk tray 20. Such guide member 30, when it is to be attached to disk tray 20, can be attached by engaging engagement parts 32 into holes 25 in disk tray 20, and when it is to be removed from disk tray 20, it can be removed by releasing the engagement between engagement parts 32 and holes 25. In other words, guide member 30 is provided on disk tray 20 detachably. Protrusion distance H from the surface of disk tray 20 to the surface of cover part 31 when guide member 30 is attached to disk tray 20 is set so that guide member 30 does not touch device main body 10 when guide member 30 is attached to disk tray 20 and said disk tray 20 is inserted into device main body 10.

Figure 5A:
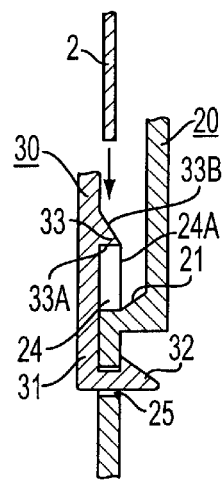
FIGS. 5A through 5C show the procedure for mounting an optical disk in the aforesaid embodiment.
Figure 5B:
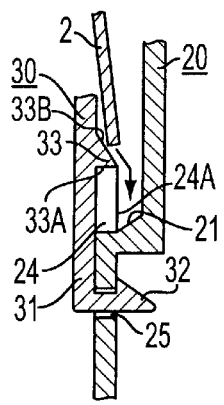
Figure 5C:
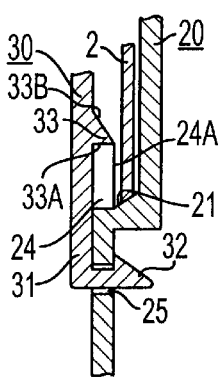

The procedure by which optical disk 2 is mounted in such a disk device 1 is as follows. First, if disk device 1 is to be used in the horizontal orientation, in which disk tray 20 is horizontal, one removes guide member 30. Then one inserts optical disk 2 between claws 24 and depression 21 and mounts said optical disk 2 into disk tray 20. However, if disk device 1 is to be used in the vertical orientation, in which disk tray 20 is vertical, one attaches guide member 30. Then, as shown in FIG. 5A, one inserts optical disk 20 by dropping it in between guide member 30 and disk tray 20. Then, as shown in FIGS. 5B and 5C, optical disk 2 slides along guide surface 33B and disk support surface 24A and is automatically guided between depression 21 and claws 24. Thereafter, optical disk 2 is mounted in disk tray 20.

This procedure has several beneficial effects. For example, when mounting optical disk 2 in disk device 1 in the vertical orientation, by moving optical disk 2 along guide member 30, one can automatically guide said optical disk 2 between depression 21 and claws 24, which eliminates the inconvenience of mounting optical disk 2 that is caused by disk device 1 being in the vertical orientation, and facilitates the operation of mounting optical disk 2 into disk tray 20. In addition, because guide member 30 is detachable, one can attach it if disk device 1 is to be used in the vertical orientation and remove it, or not use it at all, if it is to be used in the horizontal orientation. This makes the operation of mounting optical disk 2 easy, regardless of the orientation of disk device 1. Also, inserting and mounting optical disk 2 into disk tray 20 can be done surely and easily, because guide part 33, which has guide surface 33B that is continuous with disk support surface 24A of claws 24, is provided on guide member 30, and optical disk 2 is guided between depression 21 and claws 24 by moving it toward depression 21 over guide surface 33B and sliding said optical disk 2 along guide surface 33B and disk support surface 24A. Furthermore, because cover part 31 of guide member 30 is formed large enough to cover part of optical disk 2, by dropping optical disk 2 in between guide member 30 and disk tray 20 from above disk tray 20, optical disk 2 can be simply guided between depression 21 and claws 24, thereby making the operation of mounting optical disk 2 in disk tray 20 easier. In addition, because engagement parts 32 are provided on guide member 30, when guide member 30 is to be attached to disk tray 20, it can be attached simply, just by causing engagement parts 32 to engage with holes 25 in disk tray 20, thereby facilitating the operation of attaching guide member 30.

Also, this invention is not limited to the aforesaid embodiment but includes other constructions. For example, in the aforesaid embodiment, guide member 30 is made detachable with respect to disk tray 20 by forming holes 25 in disk tray 20 and providing engagement parts on guide member 30 that engage with holes 25, but the invention is not to be limited to this. That is, for example, there may be provided clamping parts on the guide member that clamp each claw of the disk tray from both sides so that the guide member itself is detachable from the claws of the disk tray. In this way, one obtains the same structure as disk device 1 of the aforesaid embodiment by providing a guide member on a general-purpose disk device.

In the aforesaid embodiment, the guide member is attached to the disk tray by engaging engagement parts into holes, but this invention is not limited to this. For example, the guide member may be attached to the disk tray by providing ball-shaped protrusions in the disk tray, providing fitting holes in the guide member into which these protrusions fit, and fitting the protrusions and the fitting holes together. In other words, it suffices to provide a guide member that can be attached to and detached from the disk tray, and the shape and composition of the attachment structure may be determined suitably in the implementation.

In addition, the guide member need not have a cover part or guide part, as long as the optical disk can be guided between the depression and the claws; its shape and construction may be determined suitably in the implementation.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A disk device comprising:
    a) a main body;
    b) a disk tray loadable into said main body and having a depression into which a disk, having an external circumference, is placed;
    c) said depression further comprising claw members that are adapted to support part of the external circumference of said disk, and
    d) a guide member removably attachable to said disk tray that guides said disk between said depression and said claw members.

2. A disk device as described in claim 1, wherein said claw members further comprise a disk support surface and said guide member further comprises a guide surface that is continuous with said disk support surface.

3. A disk device as described in claim 2, wherein said guide member is dimensioned to cover part of said disk.

4. A disk device as described in claim 1, wherein said guide member comprises engagement parts that are engageable with engagement stop holes formed in said disk tray.

5. A guide member for use with a disk device, said disk device having a disk tray with a depression formed therein and into which a disk is insertable and by which said disk is loaded into a device main body, said disk having an external circumference, said depression further comprising claw members having a disk support surface for supporting part of said external circumference of said disk, said guide member comprising:
    a) a guide surface continuous with said disk support surface for guiding an inserted disk between said depression and said claw members, and
    b) wherein said guide member is formed detachably with respect to said disk tray.

6. A guide member as described in claim 5, wherein said guide member is dimensioned to cover part of a disk insertable into said disk tray.

7. A disk tray for use with a disk device, said disk tray comprising:
    a) a depression having a peripheral edge into which a disk having an external circumference is placed;
    b) at least one claw member disposed along the peripheral edge of said depression and adapted to support part of the external circumference of said disk; and
    c) a guide member removably attachable to said disk tray that guides a disk between said depression and said claw members.

8. A disk tray in accordance with claim 7, wherein said at least one claw member further comprises a disk support surface and said guide member further comprises a guide surface that is continuous with said disk support surface of said at least one claw member.

9. A disk tray in accordance with claim 8, wherein said guide member further comprises engagement parts that are engageable with engagement stop holes formed in said disk tray.

10. A disk tray in accordance with claim 9, wherein said engagement parts and said guide surface are formed integrally with said guide member.

11. A disk tray in accordance with claim 8, wherein said at least one claw member has an end face and said guide surface has a contact surface that comes into contact with said end face of said at least one claw member during engagement of said guide member with said disk tray.

12. A disk tray in accordance with claim 11, wherein said guide surface of said guide member forms an acute angle with respect to said contact surface of said guide member.

13. A disk tray in accordance with claim 8, wherein said guide surface of said guide member has an arcuate shape.

14. A disk tray in accordance with claim 7, wherein said guide member is dimensioned to cover part of an inserted disk when said guide member is attached to said disk tray.

* * * * *